US009424018B2

(12) United States Patent
Wong et al.

(10) Patent No.: US 9,424,018 B2
(45) Date of Patent: Aug. 23, 2016

(54) FILTERING AND PROMOTING APPLICATION STORE APPLICATIONS

(75) Inventors: Karen K. Wong, Seattle, WA (US); Ankur Patel, Sammamish, WA (US); Swee Chee Pang, Sammamish, WA (US); Jonathan J. Wang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 13/052,983

(22) Filed: Mar. 21, 2011

(65) Prior Publication Data

US 2012/0246291 A1 Sep. 27, 2012

(51) Int. Cl.
 G06F 15/173 (2006.01)
 G06F 9/445 (2006.01)
 G06Q 30/06 (2012.01)

(52) U.S. Cl.
 CPC .............. *G06F 8/61* (2013.01); *G06Q 30/0603* (2013.01)

(58) Field of Classification Search
 CPC . G06F 15/16; H04L 67/303; H04L 63/0227; H04W 4/001
 USPC ........................................ 709/225, 224, 203
 See application file for complete search history.

(56) References Cited

U.S. PATENT DOCUMENTS

| 6,356,905 B1 * | 3/2002 | Gershman et al. .......... 705/26.8 |
| 6,496,979 B1 * | 12/2002 | Chen ........................ G06F 8/61 717/178 |
| 7,113,776 B2 | 9/2006 | Minear et al. |
| 7,124,409 B2 | 10/2006 | Davis et al. |
| 7,233,790 B2 * | 6/2007 | Kjellberg .......... G06F 17/30905 455/414.1 |
| 7,493,388 B2 * | 2/2009 | Wen et al. .................... 709/224 |

(Continued)

FOREIGN PATENT DOCUMENTS

| CN | 101073055 | 11/2007 |
| EP | 2175613 | 4/2010 |

(Continued)

OTHER PUBLICATIONS

"International Search Report", Mailed Date: Sep. 24, 2012, Application No. PCT/US2012/028386, Filed Date: Mar. 9, 2012, pp. 8.

(Continued)

*Primary Examiner* — Kevin Bates
*Assistant Examiner* — Clarence McCray
(74) *Attorney, Agent, or Firm* — Bryan Webster; Judy Yee; Micky Minhas

(57) ABSTRACT

Techniques for filtering and promoting application store applications are described that can be employed to provide filtered application information and/or application promotions to client devices. The filtering and promoting can be based at least in part upon system information that describes configurations and capabilities of the client devices. In one or more embodiments, various system information for a client device is detected. The detected system information for the client device is used to filter application data in an application catalog. Page information to be provided to the client device for interaction with the application catalog is then ascertained using the filtered application data. The page information is sufficient to enable the client device to render targeted application store pages having filtered application information and/or promotions that are selected based on the detected system information.

14 Claims, 6 Drawing Sheets

(56) References Cited

U.S. PATENT DOCUMENTS

| | | | |
|---|---|---|---|
| 7,512,401 B2* | 3/2009 | Muhonen | G06F 8/61 455/414.1 |
| 7,577,620 B1* | 8/2009 | Donner | 705/67 |
| 7,779,407 B2 | 8/2010 | Adams | |
| 7,966,391 B2* | 6/2011 | Anderson et al. | 709/223 |
| 8,060,639 B2* | 11/2011 | Smit et al. | 709/231 |
| 8,166,106 B2* | 4/2012 | Biggs | G06F 8/60 709/203 |
| 8,209,620 B2* | 6/2012 | Dempski et al. | 715/764 |
| 8,359,016 B2* | 1/2013 | Lindeman et al. | 455/414.1 |
| 8,516,308 B1* | 8/2013 | Gill | H04L 67/34 714/26 |
| 8,731,529 B2* | 5/2014 | Lindeman | H04W 4/001 455/414.1 |
| 8,788,944 B1* | 7/2014 | Gill | G06F 8/61 715/744 |
| 9,055,120 B1* | 6/2015 | Firman | G06F 8/60 |
| 2001/0003835 A1* | 6/2001 | Watts | 709/318 |
| 2002/0078168 A1* | 6/2002 | Christfort et al. | 709/217 |
| 2004/0030746 A1* | 2/2004 | Kavacheri et al. | 709/203 |
| 2004/0034853 A1* | 2/2004 | Gibbons | G06F 8/61 717/174 |
| 2004/0043763 A1* | 3/2004 | Minear | H04L 29/06 455/419 |
| 2004/0054569 A1* | 3/2004 | Pombo et al. | 705/7 |
| 2004/0068532 A1* | 4/2004 | Dewing et al. | 709/200 |
| 2004/0109188 A1* | 6/2004 | Akiyoshi et al. | 358/1.13 |
| 2005/0086316 A1 | 4/2005 | Chen | |
| 2005/0108708 A1 | 5/2005 | Im | |
| 2005/0188066 A1* | 8/2005 | Papanikolaou et al. | 709/223 |
| 2005/0198265 A1* | 9/2005 | Veprek et al. | 709/224 |
| 2005/0246724 A1* | 11/2005 | Foehr | G06F 21/10 719/321 |
| 2006/0143622 A1* | 6/2006 | Prabandham | G06F 9/445 719/328 |
| 2007/0011317 A1* | 1/2007 | Brandyburg et al. | 709/224 |
| 2007/0201358 A1* | 8/2007 | Kawamoto et al. | 370/230 |
| 2007/0260704 A1* | 11/2007 | Sagoo et al. | 709/217 |
| 2007/0288623 A1* | 12/2007 | Kato et al. | 709/223 |
| 2008/0178202 A1* | 7/2008 | Blackman et al. | 719/327 |
| 2008/0222621 A1* | 9/2008 | Knight et al. | 717/151 |
| 2008/0250323 A1* | 10/2008 | Huff | 715/733 |
| 2008/0270561 A1* | 10/2008 | Tang et al. | 709/207 |
| 2009/0019061 A1* | 1/2009 | Scannell, Jr. | 707/10 |
| 2009/0024937 A1* | 1/2009 | Lauff et al. | 715/762 |
| 2009/0276633 A1* | 11/2009 | Silverbrook et al. | 713/176 |
| 2010/0057790 A1* | 3/2010 | Johnson | 707/204 |
| 2010/0088367 A1* | 4/2010 | Brown | G06F 8/60 709/203 |
| 2010/0205274 A1 | 8/2010 | Gharabally et al. | |
| 2010/0223393 A1* | 9/2010 | Silverbrook et al. | 709/231 |
| 2010/0233996 A1 | 9/2010 | Herz et al. | |
| 2011/0029881 A1* | 2/2011 | Smith | G06F 8/60 715/735 |
| 2011/0161409 A1* | 6/2011 | Nair et al. | 709/203 |
| 2011/0177775 A1* | 7/2011 | Gupta et al. | 455/3.06 |
| 2011/0202947 A1* | 8/2011 | Gupta et al. | 725/14 |
| 2011/0202966 A1* | 8/2011 | Gupta et al. | 725/114 |
| 2011/0209181 A1* | 8/2011 | Gupta et al. | 725/62 |
| 2011/0258301 A1* | 10/2011 | McCormick et al. | 709/222 |
| 2012/0072312 A1* | 3/2012 | Lange et al. | 705/27.1 |
| 2012/0096435 A1* | 4/2012 | Manolescu et al. | 717/121 |
| 2012/0110568 A1* | 5/2012 | Abel | G06F 8/61 717/178 |
| 2012/0129503 A1* | 5/2012 | Lindeman et al. | 455/414.1 |
| 2012/0131685 A1* | 5/2012 | Broch et al. | 726/30 |
| 2012/0194851 A1* | 8/2012 | Srinivasmurthy K et al. | 358/1.15 |
| 2012/0196571 A1* | 8/2012 | Grkov et al. | 455/411 |
| 2012/0216122 A1* | 8/2012 | Wong et al. | 715/738 |
| 2012/0246291 A1* | 9/2012 | Wong et al. | 709/224 |
| 2013/0117351 A1* | 5/2013 | Zoheir et al. | 709/203 |
| 2013/0166527 A1* | 6/2013 | Kasterstein | G06F 17/30424 707/706 |
| 2014/0007057 A1* | 1/2014 | Gill | G06F 8/61 717/126 |
| 2014/0289702 A1* | 9/2014 | McMahon | G06F 21/60 717/120 |
| 2015/0365469 A1* | 12/2015 | Procopio | H04L 67/10 709/217 |

FOREIGN PATENT DOCUMENTS

| | | | | |
|---|---|---|---|---|
| EP | 2175613 A1 * | 4/2010 | | H04L 29/08 |
| JP | 2003248586 | 9/2003 | | |
| JP | 2008269634 | 11/2008 | | |
| JP | 2011044147 | 3/2011 | | |
| WO | WO-0172064 | 9/2001 | | |
| WO | 2007003045 A1 | 1/2007 | | |
| WO | WO-2010002490 | 1/2010 | | |

OTHER PUBLICATIONS

Song, et al., "Design of Recommendation System about User Customized Smart Phone Application", The Korean Society of Broadcast Engineers, Jul. 2010, pp. 4.

Levine, et al., "Mapping of an Automated Target Recognition Application from a Graphical", Retrieved at<<http://ieeexplore.ieee.org/stamp/stamp.jsp?tp=&arnumber=803702>>, 1999, pp. 2.

Jover, Guillem, "Proposal: Automatic selection of hardware specific packages",Retrieved at <<http://www.pubbs. net/201003/debian/67293-proposal-automatic-selection-of-hardware-specific-packages.html>>, Mar. 29, 2010, pp. 5.

Jordan, Patrick "iPad App Store—First Impressions", Retrieved from: <http://ipadinsight.com/ipad-apps/ipad-app-store-first-impressions/> on Aug. 8, 2013, (Apr. 1, 2010), 5 pages.

"Extended European Search Report", EP Application No. 12760711.7, Jul. 24, 2014, 6 pages.

"Foreign Office Action", EP Application No. 12760711.7, Mar. 17, 2015, 7 pages.

"UbunTuning!! 40 ways to make Ubuntu more convenient than Vista", In Proceedings of Linux100%, Shinyusha, vol. 5, Dec. 1, 2008, 3 pages.

"Foreign Office Action", JP Application No. 2014-501109, Mar. 8, 2016, 7 pages.

"Foreign Office Action", CN Application No. 201210075520.X, Apr. 6, 2016, 9 Pages.

"Summons to Attend Oral Proceedings", EP Application No. 12760711.7, Jun. 21, 2016, 6 pages.

\* cited by examiner

FILTERING AND PROMOTING APPLICATION STORE APPLICATIONS

BACKGROUND

The amount of application content available to users of various computing devices including tablet devices, laptops, mobile phones, desktop computers, and so forth, is ever-increasing. However, the sheer quantity of application choices available to users can make it difficult for users to find applications that are relevant and interesting. Users with a limited amount of time may not wish to spend a great deal of time searching among a multitude of applications and therefore simply may not discover some of the "best" applications for their devices, which detracts from the overall user experience and limits opportunities for application developers. Third party recommendations for applications and lists of popular applications have been used to assist users in finding relevant applications. However, these recommendation lists have proliferated as the amount of application content has increased and can be quite cumbersome for users to navigate.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for filtering and promoting application store applications are described that can be employed to provide filtered application information and/or application promotions to client devices. The filtering and promoting can be based at least in part upon system information that describes configurations and capabilities of the client devices. In one or more embodiments, various system information for a client device is detected. The detected system information for the client device is used to filter application data in an application catalog. Page information to be provided to the client device for interaction with the application catalog is then ascertained using the filtered application data. The page information is sufficient to enable the client device to render targeted application store pages having filtered application information and/or promotions that are selected based on the detected system information.

BRIEF DESCRIPTION OF THE DRAWINGS

The same numbers are used throughout the drawings to reference like features.

DETAILED DESCRIPTION

Overview

Techniques for filtering and promoting application store applications are described that can be employed to provide filtered application information and/or application promotions to client devices. The filtering and promoting can be based at least in part upon system information that describes configurations and capabilities of the client devices. In one or more embodiments, various system information for a client device is detected. The detected system information for the client device is used to filter application data in an application catalog. Page information to be provided to the client device for interaction with the application catalog is then ascertained using the filtered application data. The page information is sufficient to enable the client device to render targeted application store pages having filtered application information and/or promotions that are selected based on the detected system information.

In the discussion that follows, a section titled "Operating Environment" is provided and describes one environment in which one or more embodiments can be employed. Following this, a section titled "Example Methods" describes example techniques for filtering and promoting application store applications in accordance with one or more embodiments. Next, a section titled "Example User Interface" describes example user interfaces in accordance with one or more embodiments. Last, a section titled "Example System" describes example computing systems and devices that can be utilized to implement one or more embodiments.

Operating Environment

Figure 1:
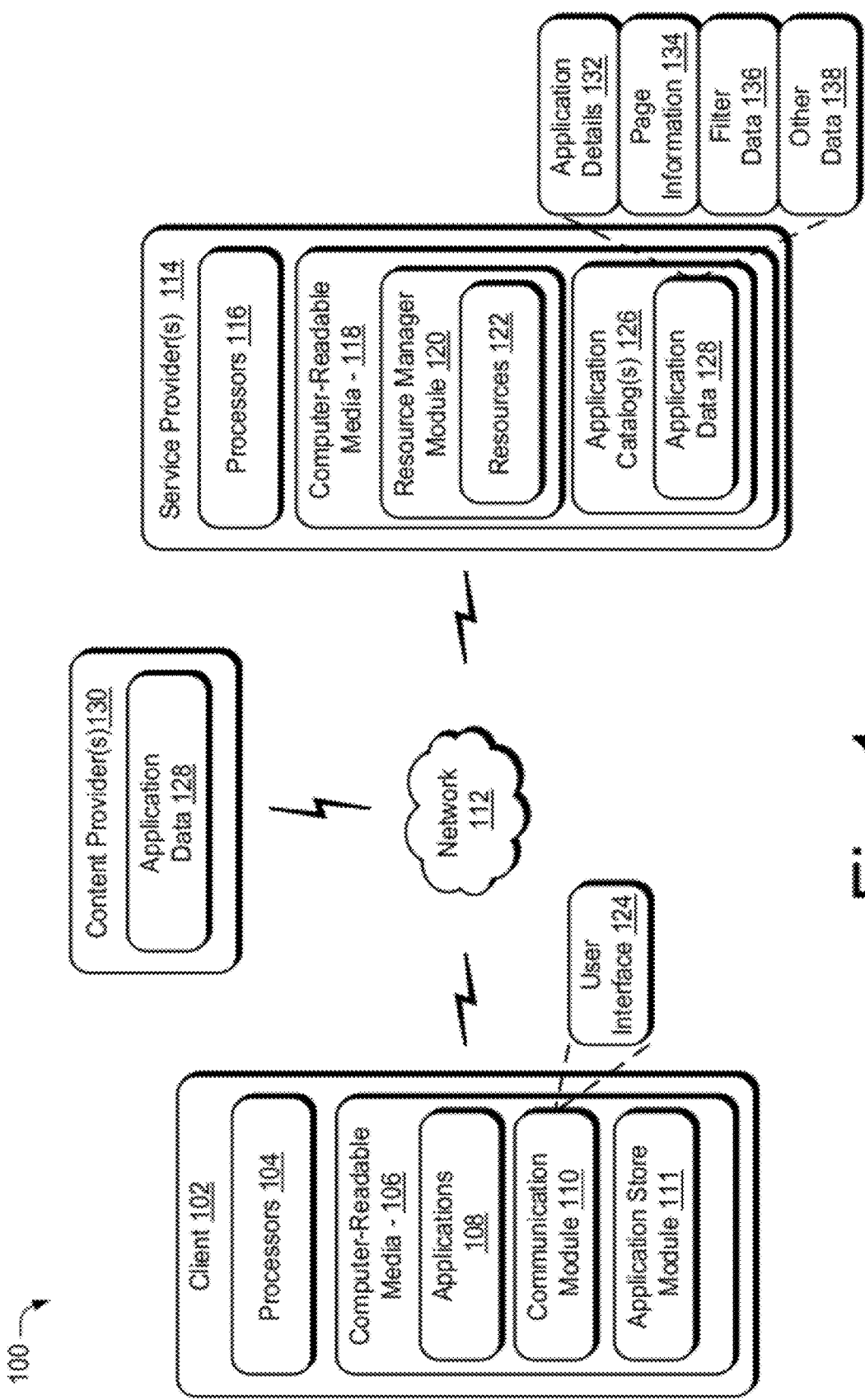
FIG. 1 illustrates an operating environment in which various principles described herein can be employed in accordance with one or more embodiments.

FIG. 1 illustrates an operating environment in accordance with one or more embodiments, generally at 100. Environment 100 includes a client 102 having one or more processors 104, one or more computer-readable media 106 and one or more applications 108 that reside on the computer-readable media and which are executable by the processor(s). The client 102 can be embodied as any suitable computing system and/or device such as, by way of example and not limitation, a desktop computer, a portable computer, as tablet computer, a handheld computer such as a personal digital assistant (PDA), a cell phone, a set-top box, and the like. One example of a computing system that can represent various systems and/or devices including the client 102 is shown and described below in FIG. 6.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 6.

In addition, client 102 includes a software application in the form of a communication module 110. The communication module 110 represents functionality of the client 102 operable to communicate with and interact with various other entities (e.g., other clients, providers, servers, web sites). For example, the communication module 110 may be configured as a web browser. Interactions with other entities can include sending and receiving electronic messages in various forms (e.g., e-mail, instant messages, text messages, and so forth) between the entities, obtaining resources (e.g., content and services) from the other entities, accessing and/or downloading various applications 108 from an online application catalog or store, and so forth.

The client 102 can also include an application store module 111 that represents functionality for enabling access of the clients to an online application database, catalog, or store (e.g., an application marketplace) through which various applications 108 can be made available to clients. Application store module 111 can be implemented in various ways to facilitate access to and navigation of a database of applications 108, selection and/or purchase of applications, and download of applications to the client 102. Application store module 111 can further be configured to implement aspects of techniques for filtering and promoting applications described above and below.

The application store module 111 can be implemented as a standalone client application and/or as a component of the communication module 110, such as being implemented as an add-in for a web browser. The application store module 111 can also be implemented as a web-hosted application that the client 102 can access and run in conjunction with a service provider over a network (e.g., "in the cloud"). Thus, the application store module 111 can be implemented in different ways for different client devices that can have different configurations and capabilities.

For instance, the client 102 can be communicatively coupled over a network 112, such as the Internet, with one or more service providers 114 from and to which resources (e.g., content and services) can be received and sent. Example service providers 114 of FIG. 1 are each depicted as having one or more processors 116 and one or more computer-readable media 118. A service provider 114 can be implemented by way of one or more server devices. Accordingly, various example components represented and described for a service provider 114 can be included on a single server device and/or can be divided between multiple different server devices.

Service provider 114 is depicted as including a resource manager module 120. The resource manager module 120 represents functionality operable by the service provider 114 to manage various resources 122 that may be made available over the network 112. For example, various resources 122 can be provided by way of web pages, HTML pages, application UIs, or other user interfaces 124 that are communicated over the network 112 for output by the client 102. The resource manager module 120 can manage access to the resources 122, performance of the resources 122, configuration of user interfaces or data to provide the resources 122, and so on.

Generally, resources 122 made accessible by a service provider 114 can include one or more services and/or content. A service provider 114 can provide one or more web servers and/or sites, which a client 102 can navigate to in order to access the resources 122. The resources 122 can include any suitable combination of services and/or content typically made available over a network by one or more providers. Some examples of services include, but are not limited to, an application store service to manage and provide client access to a database of applications 108, a search service, an email service to send and receive email, an instant messaging service to provide instant messages between clients 102, and a social networking service to facilitate connections and interactions between groups of users who share common interests and activities. Additional examples of services include a shopping service, a weblog service, productivity service, an authentication service, a news service, and an advertisement service to name a few. Content may include various combinations of text, video, ads, audio, multi-media streams, animations, images, web pages, web applications, device applications, content for display by a browser or other device application, pages, URLS, and/or links for use by an application store module 111, and the like.

In addition, the service provider 114 can include or otherwise make use of one or more application catalogs 126 configured to store a variety of different application data 128 related to applications that are made available to clients 102 for purchase and/or download. A variety of application data 128 can be collected from one or more content providers 130 over the network 112. The content providers 130 represent developers, device manufacturers, and other third parties who may develop applications and distribute the applications to clients using the application store infrastructure managed by the service provider 114 and represented by the example environment 100 depicted in FIG. 1. Content providers 130 can publish the applications they develop through the service provider 114, which can include providing application data 128 for inclusion in the application catalog 126. Naturally, the service providers 114 can also include their own applications in the application catalog 126. Clients 102 can then navigate and select applications for download from the application catalog 126 using the application store module 111.

As depicted in FIG. 1, application data 128 describing applications can include various data such as application details 132, page information 134, and filter data 136. Application details 132 can include detailed information describing applications in the applications catalog such as identifiers, pricing info, category data, developer information, ratings, descriptions, promotions, download URLs or addresses, and so forth. The applications for download can also be maintained as part of application details 132. Additionally or alternatively download URLs or addresses can be used to access applications from various locations such as through download servers managed by the service provider 114, from different content providers 130, using a peer-to-peer network of clients 102, and/or using any other suitable download mechanism.

Page information 134 represents various content that can be used to build and/or output various pages for interaction with the application catalog. Page information 134 can include complete pages, portions of pages, HTML code or other mark-up language code, script, URLs and links, images, and/or other data typically used to build pages. When a client navigates through the application catalog 126 via the application store module 111, page information 134 sufficient to enable the client to render pages for interaction with the application catalog can be communicated over the network 112. This can include communicating pages that are built on the server side and/or information to enable the client 102 to build the pages on the client side.

Filter data 136 represents data that can be used to filter applications in various ways. For instance, filter data 136 can be employed to target applications to clients based on device configurations and capabilities. Application developers can use filter data 136 to match their applications to designated device configurations and capabilities. Different versions of applications can therefore be developed for different device configurations and capabilities. This can include identifying specific hardware configurations and targeting applications that are configured to work with specific hardware configurations. In this manner, clients 102 can be provided with a filtered view of the application catalog 136 that surfaces and promotes more relevant and interesting applications that are designed to work well with a particular device and/or are being promoted to the particular device. Filter data 136 can also be used to hide and/or provide notifications regarding applications that may not work well with particular devices. Further details regarding techniques for filtering and promoting application store applications can be found in relation to the following figures.

A variety of other data 136 can also be provided examples of which include topic data that can be used to organize and promote applications within different relevant topics, application support data, authentication data, client accounts and account data, and so forth.

Having described an example operating environment, consider now example methods for filtering and promoting application store applications in accordance with one or more embodiments.

Example Methods

The following section provides a discussion of flow diagrams that describe steps of example methods for filtering and promoting application store applications in accordance with one or more embodiments. The methods can be implemented in connection with any suitable hardware, software, firmware, or combination thereof. In at least some embodiments, the methods can be implemented by way of a suitability configured computing device, such as the example service provider 114 of FIG. 1 that includes or otherwise makes use of a resource manager module 120.

Figure 2:
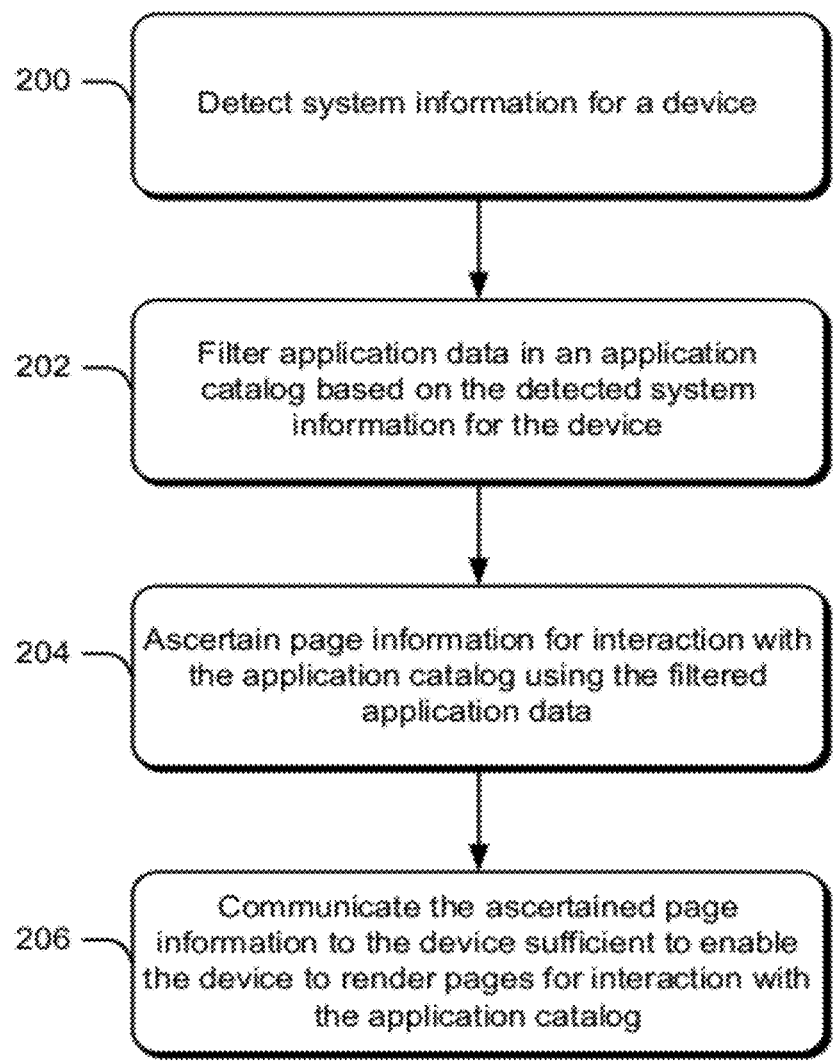
FIG. 2 is a flow diagram that describes steps of a method in accordance with one or more embodiments.

FIG. 2 is a flow diagram that describes steps of a method in accordance with one or more embodiments. In particular, FIG. 2 depicts a method in which detected system information for a device is employed to filter applications in an application catalog.

Step 200 detects system information for a device. The detection of system information for a device can occur in various ways. In one example, resource manager module 120 can operate to collect system information from one or more client devices 102. This can occur in response to requests made via the client devices to access an application catalog 126. For instance, application store module 111 of a client 102 can be configured to collect and maintain system information that describes the configuration and capabilities of the client device. Such system information can then be provided over the network 112 to the service provider 114 in conjunction with a request to access the resources 122.

In another approach, resource manager module 120 can operate to poll clients 102 at various times to obtain corresponding system information. Resource manager module 120 can then use this information to selectively serve resources 122 including applications from the application catalog 126. In yet another approach, system information can be collected and maintained by the service provider 114 in connection with client accounts. The resource manager module 120 can therefore be configured to reference a client account associated with a client 102 to detect corresponding system information.

A variety of system information can be collected and utilized. In general, system information describes the configuration and capabilities of a client 102. System information can include, by way of example and not limitation, at least some information regarding the hardware configuration of a client device. For example, system information can describe hardware components included with a device such as whether or not the device includes a radio antenna, a television tuner, a camera, a GPS receiver, a touch screen, an accelerometer, a gyroscope, and so forth. System information can also describe connected or connectable peripherals devices associated with the client device such as a keyboard, mouse, touch pad, speakers, printer, scanner, and other peripheral devices. Still further, system information encompasses basic hardware capabilities of the client such as memory, storage, processing power, device architecture, and so forth.

System information can also include, by way of example and not limitation, information regarding installed software or applications including an operating system and other device applications. This can include identification of the installed applications and/or which versions of the applications are installed. Alternately or additionally, in some embodiments, system information can include device class data that is associated with a client 102. Device class data is configured to define different classes of client devices that can be assigned to different clients and used to implement aspects of filtering and promoting application store applications, as discussed in detail in relation to FIG. 3 below.

Step 202 filters application data in an application catalog based on the detected system information for the device. A variety of filtering can occur using combinations of the different types of system information described above to identify and select applications in the application catalog 126. Generally, application data 128 can be filtered to discover applications that are targeted to or otherwise match or are consistent or compliant with the detected system information. For example, an application designed to use a GPS receiver would match or be compliant with devices having a GPS receiver and would therefore be selected for these devices. On the other hand, the example GPS application could be filtered out for devices that do not include a GPS receiver. Likewise, an application that is developed to make use of a touch screen can be matched to a touch screen tablet device and filtered out for a desktop computing device that does not include a touch screen. As noted, in at least some embodiments the filtering can be based on different device classes that are defined and assigned to different devices. Examples of using device classes to filter an application catalog are described in detail in relation to FIG. 3 below.

Step 204 ascertains page information for interaction with the application catalog using the filtered application data. Step 206 communicates ascertained page information to the device sufficient to enable the device to render pages for interaction with the application catalog. For example, the filtered application data can be employed to select, generate, and/or render pages that can be used to interact with the application catalog 126 using page information 134. In particular, one or more pages that provide a filtered view of the application catalog can be provided to a client 102 in any suitable way.

For example, using the page information 134 that is ascertained, pages can be dynamically generated by the service provider 114, by the client 102, and/or by the service provider 114 and the client 102 in combination. The service provider 114 can also select pre-configured pages that are provided over the network to the client 102 for use by the application store module 111. In another approach, page information 134 can include data such as links to content, URLs, images and other page information that is used by the application store module 111 to generate pages locally at the client. Page information can also include filtered application data that enables the application store module 111 to selectively generate one or more filtered views of the application catalog 126.

Thus, through various pages that reflect filtering applied using system information for a client device, a user of the client device can interact with one or more filtered views of an application catalog. Pages can also be configured to provide the user with options to selectively turn filtering on or off. The various pages can be arranged in various ways to enable interaction with the application catalog 126. Some examples regarding different ways in which pages for interaction with the application catalog can be configured are discussed below in relation to the example user interface depicted in FIG. 5.

By making use of system information in the manner just described, content providers 130 can develop, target, and promote applications to specific device configurations and capabilities as described above and below. Pages for interaction with an application catalog can be configured to selectively present a filtered view of the application catalog to assist users in finding relevant and interesting applications. Moreover, applications that are designed to work well with a particular device configuration can be surfaced to matching devices based on system information. This can improve the overall user experience both by helping the user find applications more easily and by promoting applications that will work well with the user's particular device. Additionally, content providers 130 benefit by being able to expose their application content in a targeted manner to user's who are most likely to download and/or purchase the application content because the application content is tailored to the users' particular devices.

Figure 3:
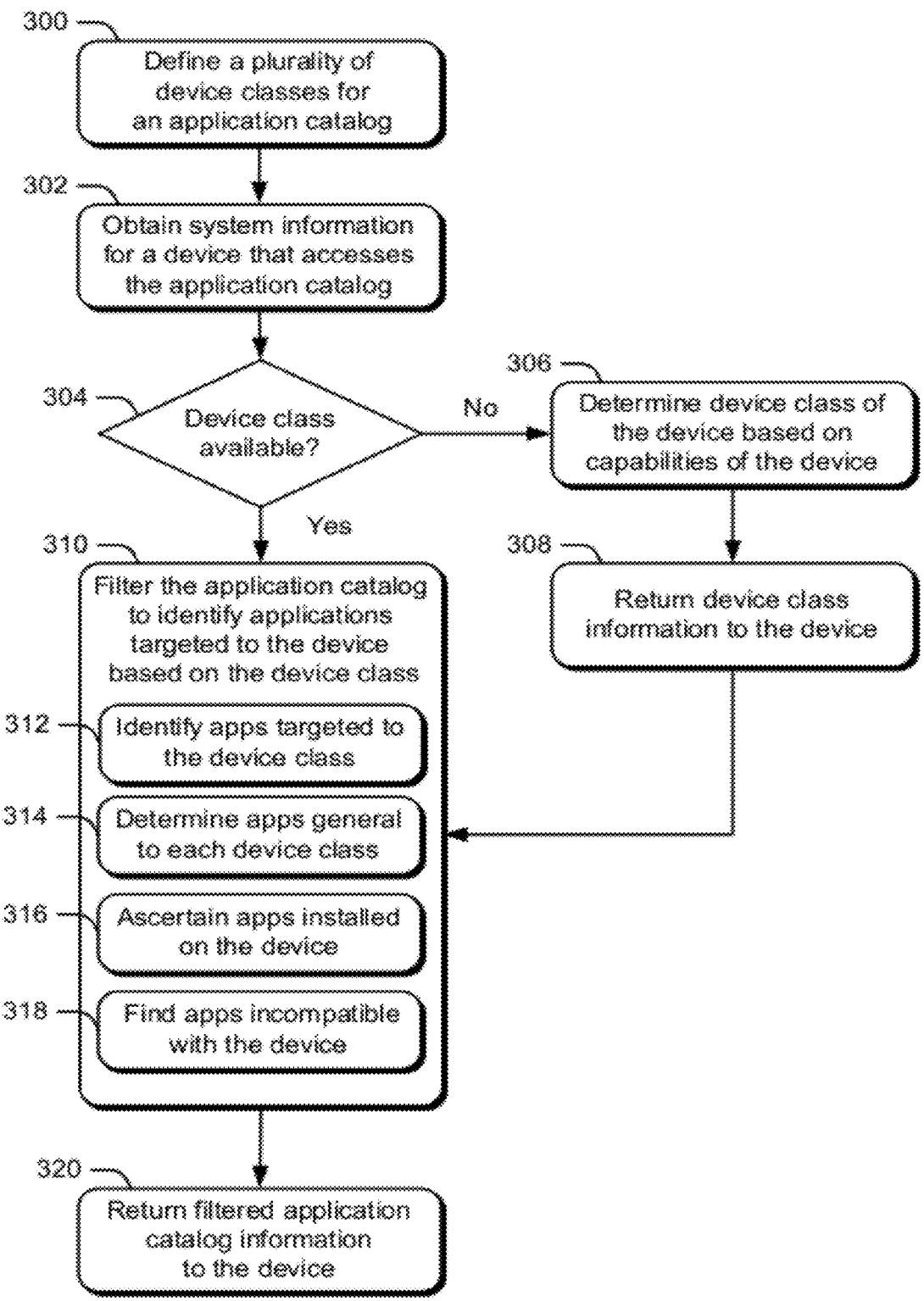
FIG. 3 is a flow diagram that describes steps of a method in accordance with one or more embodiments.

FIG. 3 is a flow diagram that describes steps of another method in accordance with one or more embodiments. In particular, FIG. 3 depicts details regarding filtering applications based upon different device classes. The example method of FIG. 3 represents but one example way in which system information associated with devices can be used for filtering of application store applications.

Step 300 defines a plurality of device classes for an application catalog. In general, the device classes are defined to classify devices into groups based on common configurations and capabilities. In one approach, the device classes are configured to broadly classify devices according to device types. For example, device classes can be configured to include different classes for slate (e.g., tablet), mobile, desktop, laptop, all-in-one, and set-top box devices.

Additionally or alternatively, more granular classes and/or subclasses can be defined to create classes related to different configurations and capabilities described by system information. By way of example and not limitation, different classes can be defined as standalone classes or subclasses for devices having certain components such as a camera, a GPS receiver, or a touch screen and/or for devices having selected capabilities such as a selected amount of memory, processing power, operating system version, architecture, and so forth. A variety of other classes based on system information can be utilized without departing from the spirit of the claimed subject matter.

In one approach, the broad classifications can be combined with different subclasses to create a multitude of options for classifying devices. By way of example and not limitation, classes can be combined to form classes such as slate with camera, slate without camera, slate with GPS and camera, desktop with at least four gigabytes of RAM, and/or set-top box with ten gigabyte hard drive, to name a few examples. A variety of other combinations comparable to the enumerated examples can also be utilized.

Any suitable data, field, or identifier can be employed to designate the classes and assign a device class to a particular device. An application store module 111 of a client 102 can be configured to identify, assign, and/or or maintain a device class for a device, such as by setting a device class field to an appropriate value.

Step 302 obtains system information for a device that accesses the application catalog. A service provider 114 can obtain system information in any suitable way. This step can occur by detecting and/or collecting system information for a device using techniques comparable to those described above in relation to FIG. 2. For example, a resource manager module 120 of a service provider 114 can obtain system information for a client 102 that is communicated by an application store module 111 in connection with a request to access the application catalog 126. The service provider 114 can alternatively pro-actively poll clients 102 to obtain and/or store system information at various times.

Step 304 determines whether a device class is available. This step involves examining the system information that is obtained for a device to check for device class data. For example, a device class field or other suitable data can be included with system information to associate a device class with a client 102. If the device class field is populated with a device class, the device class can be used directly for filtering and promoting of applications. On the other hand, if the device class field is empty or device class information is otherwise unavailable, then system information provided by a client device can be used to determine a device class for the client device and/or to perform filtering and promoting of applications.

In one approach, application store module 111 of a client 102 can be configured to provide the device class if available and otherwise provide system information for use by the service provider 114 if the device class if unavailable at the client 102. In other words, the device class can be obtained by the service provider and can be used as an alternative to having to obtain complete system information for a device when the device interacts with the application catalog. This approach can result in reduced communication traffic over the network, decreased analysis time, and less data collection for the service provider 114 and clients 102 alike. At the same time, devices that cannot provide the device class and/or do not support the device class approach can still take advantage of the described techniques for filtering and promoting application store applications.

More particularly, if a device class is not available, step 306 determines a device class for the device based upon the capabilities of the device. Here, the resource manager module 120 can operate to analyze the system information to match the client device to one or more of the classes described above. This can include assigning the device to a broadly defined class and/or one or more sub-classes. For example, the client 102 can be assigned to a mobile device class and to classes for camera and touch screen based on the system information. To do so, the resource manager module 120 can examine various criteria used to define the classes and determine classes for which configuration and capabilities of a device defined by the system information match the criteria for the classes. The device can then be assigned to these matching classes by setting device class fields or other suitable data for the device to appropriate values.

Step 308 returns information regarding the device class to the device. For example, the resource manager module 120 can return data describing the classes determined in step 306 over the network 112 to the client 102. This enables the application store module 111 of a client 102 to make use of the device class for subsequent interaction with the application catalog 126.

Having determined the device class directly in step 304 or by analyzing system information as per steps 306 and 308, step 310 filters the application catalog to identify applications targeted to the device based on the device class. This can involve searching multiple different categories and types of application using the device class as represented by example sub-steps 312-318 in FIG. 3. In general, in one or more embodiments, filtering can include comparing the device class to application data 128 to discover applications that are targeted specifically to a device or are otherwise a good match to device configuration and capabilities that are represented by the device class.

In particular, step 312 identifies applications targeted specifically to the device class. Applications that are examined for filtering operations can include both third-party applications from content providers 130 and applications that are developed by the service provider 114. The applications can be associated in the application catalog with device class data to match the applications to selected device classes. For example, filtering that is performed for the mobile device having a camera and a touch screen in the preceding example can identify various applications that are targeted to mobile devices, cameras, touch screens, and/or combinations of these using the one or more device classes associated with the device.

Step 314 determines applications that are designated as being general applications to each device class. Such applications can be those that are considered appropriate for each device class. These general applications are effectively not filtered based on device classes.

Step 316 ascertains applications that are installed on the device and step 318 finds applications that are incompatible with the device. As noted, system information can include information that identifies applications and application versions that are already installed on the device. In addition, the device class can be used to identify applications that are incompatible with or are otherwise not suited to a device. For example, a camera application can be considered incompatible with a device that does not include a camera. Likewise, a mapping program that uses GPS can be considered incompatible with a device that does not have a GPS receiver.

Step 320 returns the filtered application catalog information to the device. For instance, filtering operations as just described in relation to steps 310-318 can produce a filtered application catalog that places applications in different filter groups relative to a particular device/device class. The filtered application catalog and filter groups can be stored as filter data 136 as depicted in FIG. 1. The filtered application catalog information can be returned to the client 102 in various ways. This can include returning page information and/or pages that reflect the filtering. The client 102 can use the filtered application catalog information in various ways to provide filtered views of the application catalog through one or more pages. This can include selectively showing or hiding applications that are placed within the different filter groups in different views and/or pages.

In particular, the different filter groups can include targeted applications, general applications, installed applications, incompatible applications, and so forth. By filtering and forming filter groups in this manner, targeted applications can be selectively surfaced, promoted, highlighted, exposed, or otherwise be identified differently than other applications within pages used for interaction with the application catalog 126. General applications can be shown along with targeted applications and/or using different pages, views, and/or portions of pages. Applications that are already installed on a device as well as incompatible applications can be hidden, flagged, or otherwise be differentiated from targeted and/or general applications in various pages.

The application store module 111 can also provide various options selectable to enable a user to turn filtering on and off. Thus, a default view may be configured to show targeted applications with a selectable control that can be used to expand the view to include general applications, all applications, and so forth. Thus, filter data 136 including filtered application catalog information and filter groups can be used in various ways to build pages that provide a great deal of flexibility to view and navigate an application catalog, further examples of which can be found below in relation to the example user interface of FIG. 5.

Figure 4:
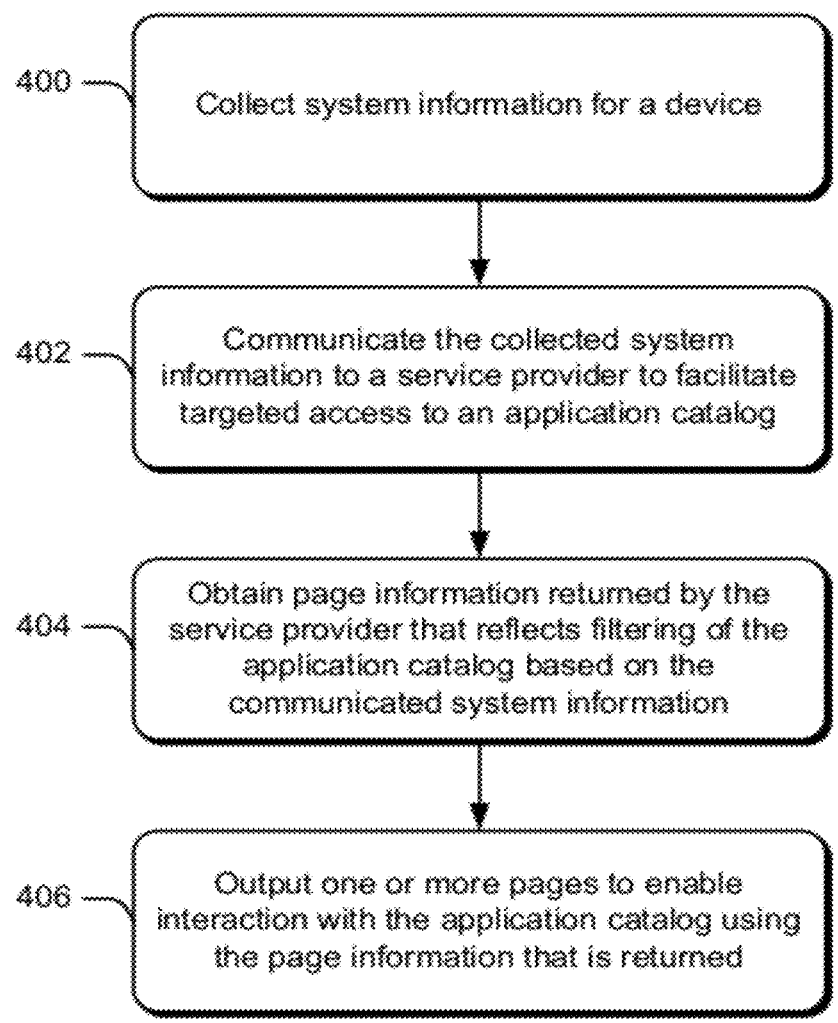
FIG. 4 is a flow diagram that describes steps of a method in accordance with one or more embodiments.

FIG. 4 is a flow diagram that describes steps of another method in accordance with one or more embodiments. In particular, FIG. 4 depicts a method having details regarding interaction of client 102 with an application catalog 126 made available by a service provider 114. In at least some embodiments, the method can be performed by an application store module 111 as described above and below.

Step 400 collects system information for a device. For example, application store module 111 can operate to collect and maintain various system configuration and capability data at a client 102. This can occur through interaction with an operating system of the client 102. In some embodiments, an application programming interface (API) can be used to obtain system information from the operating system, monitor changes to the system information, and update the system information as appropriate.

As noted, application store module 111 can also maintain device class data. Application store module 111 can also operate to derive a device class using system information. This can occur in connection with an attempt to access an application catalog and/or at other times such as periodically, in response to system changes, and so forth. In one approach, the application store module 111 can interact over the network to obtain data that describes the various device classes. Application store module 111 can then use this data locally at the client to derive a device class. In another example, application store module 111 can communicate system information to a service provider 114 and obtain a device class determined by the service provider 114 in response to the communication. Again, this can occur at different times including but not limited to occurring in connection with an attempt to access an application catalog from the service provider 114.

Step 402 communicates the collected system information to a service provider to facilitate targeted access to an application catalog. For instance, application store module 111 can operate to communicate system information to the service provider 114 upon request, in connection with an attempt to access the application catalog 126, and so forth. This can include sending a device class if available and/or system information by the client 102 to the service provider 114. In response to this communication, the service provider 114 can use the device class and/or system information to filter the application catalog based on configuration and capabilities of the device using the various approaches described above and below.

Step 404 obtains page information returned by the service provider that reflects filtering of the application catalog based on the communicated system information. For example, application store module 111 can operate to obtain various page information from the service provider 114. This can occur when the client 102 attempts to access the application catalog 126. The service provider 114 can also push application store updates including page information to the client 102 at times other than when the client 102 attempts to access the application catalog 126. Application store module 111 can then use the application store updates locally without having to communicate with the service provider 114, such as when the device is "offline."

Step 406 outputs one or more pages to enable interaction with the application catalog using the page information that is returned. In particular, application store module 111, alone or in conjunction with the resource manager module 120, can use the various page information obtained in step 404 to build and/or output pages for interaction with the application catalog. The pages can be configured to present targeted applications in various ways. This can include selectively showing just the targeted applications, highlighting or promoting one or more targeted applications, enabling a user to selectively show all applications or just the targeted applications, and so forth. The pages can be pre-configured pages that are obtained from the service provider 114. A page or portions thereof can also be dynamically generated at the client 102 based on page information returned by the service provider. This can occur by using page and/or code templates to dynamically configure at least some portions of the page. Pages, templates, code, URLs, images, and so forth used to build pages can be defined and implemented using any suitable techniques including but not limited to XML or other mark-up language code, documents, and tags.

Having considered various example methods for filtering and promoting application store applications, consider now an example user interface that can be employed to implement various aspects of filtering and promoting application store applications in accordance with one or more embodiments.

Example User Interface

Figure 5:
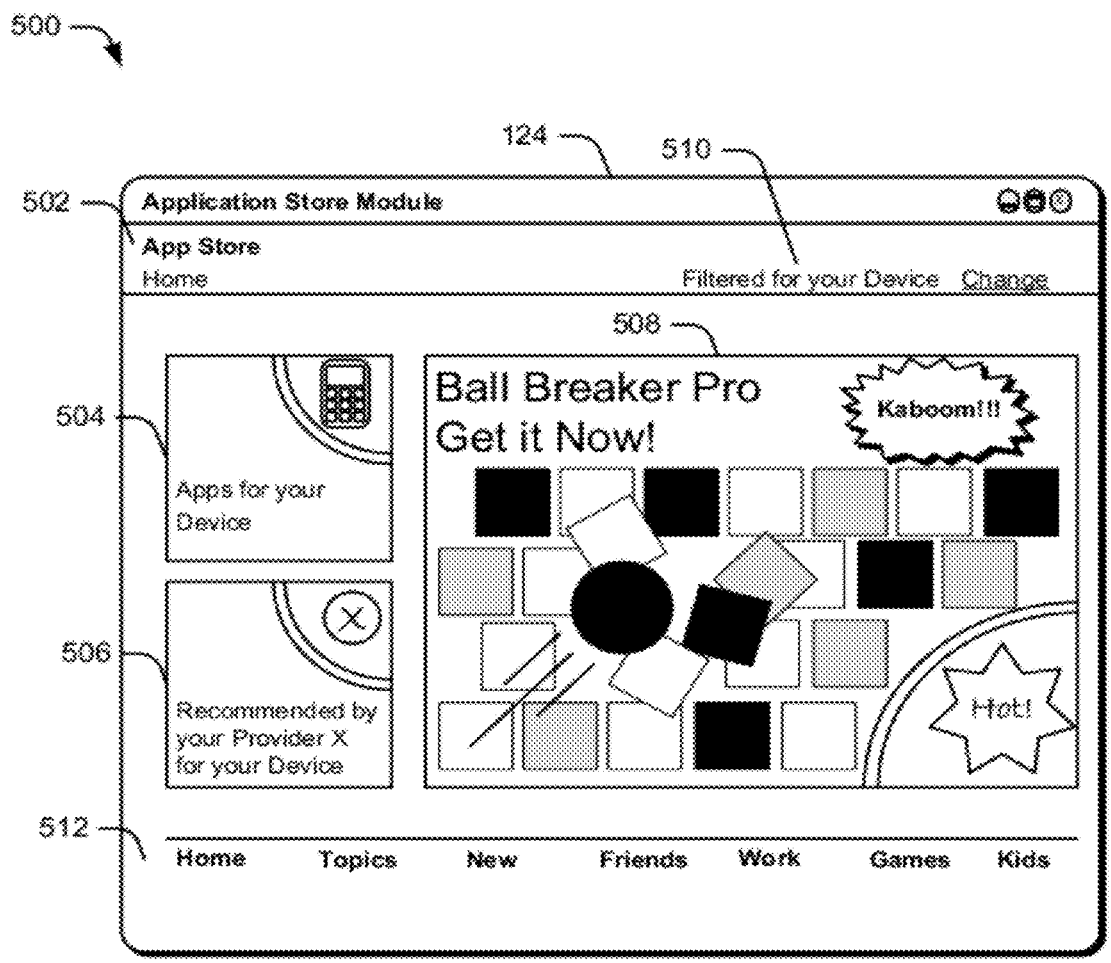
FIG. 5 is an example user interface in accordance with one or more embodiments.

FIG. 5 depicts, generally at 500, one example of a user interface 124 for interaction with an application catalog 126 that can be output via an application store module 111. In this example, the user interface 124 includes a page 502 that can include various portions that are configured to implement filtering and promotion of applications based on system information. The example page 502 represents a home page of an applications store that can be configured to enable navigation to various other pages. Portions in the home page, as well as in other pages, can be configured in various ways to present and highlight targeted application information in a more prominent way relative to applications that are not targeted.

In particular, the page 502 can include a device specific applications portion 504 that can be configured in any suitable way to identify and present device specific applications. In this example, the device specific applications portion 504 is represented by a selectable tile. Selection of this portion can expose another page that presents a listing or other view of various applications that are targeted to a particular device based upon system information as described herein.

The page 502 also includes a recommended applications portion 506 that can be configured in any suitable way to identify and present applications recommended by a particular entity. In the example, the recommended applications portion 506 is also shown as a tile that when selected can expose another page that presents a listing or other view of applications recommended by a corresponding entity This portion enables entities such as content providers 130, device manufacturers, and service providers 114 to target and/or promote applications that are "approved" or otherwise considered good fits for particular devices.

For instance, the example provider "X" may be a manufacturer of a particular laptop device. Since the provider X would like users to have a good experience with their equipment, the provider X can use recommended applications portion 506 to recommend applications that they think provide such an experience. In some embodiments, device classes can be defined to correspond to particular content providers, manufacturers, or other entities. The recommended applications portion 506 can be configured to present different recommendations according to particular device classes. Thus, the content providers, manufacturers, or other entities can make use of their own device classes to recommend applications using the described techniques.

Page 502 also includes a promoted applications portion 508. Here a special offer, new application, popular item or other application can be promoted. The promoted applications portion 508 can be configured to present different promotions to different devices. In particular, the promotion to be shown in the promoted applications portion 508 can be selected based on device configurations and capabilities and/or using device classes. Thus, devices with different configurations and capabilities may be served different promotions. In the example, the "Ball Breaker Pro" application can be selected for devices that have a touch screen. Other devices that do not have a touch screen may be unable to use this application properly. Therefore, these devices can be served other device specific promotions.

Another feature is a filter selection control 510 that can be used to selectively turn filtering on or off. The filter selection control 510 can be used to toggle between different filtered and unfiltered views of pages that are presented by the application store module 111. This filter selection control 510 can make use of different filter groups derived in the manner previously described to turn different filtered views on or off. For example, the "Change" link in the example page 502 can be selected to expose various options that enable a user to select whether to show or hide different filter groups within the user interface 124.

The page 502 additionally includes a navigation bar 512 that represents various navigation links that can assist a user with navigation between different pages of the application catalog. Navigation links can be configured in various ways. In the depicted example the links are configured to present different views within selected categories. For example, the "Home" link can be used to navigate to the example home page depicted in FIG. 5. The "Topics" link can enable navigation to a view of applications organized according to different topics. The topics can be arranged to reflect different areas of interest such as geographic locations, specific devices or manufacturers, current events or holidays, and so forth. The topic pages can present different views of applications that are relevant to the various topics. The "New" link can enable navigation to a view of newly available applications. Additional example links can be provided to represent additional categories such as applications that are related to a user's friends, work applications, games, kids applications, and so forth.

Having considered an example user interface for filtering and promoting application store applications, consider now an example system that can be employed to implement various aspects of filtering and promoting application store applications in accordance with one or more embodiments.

Example System

Figure 6:
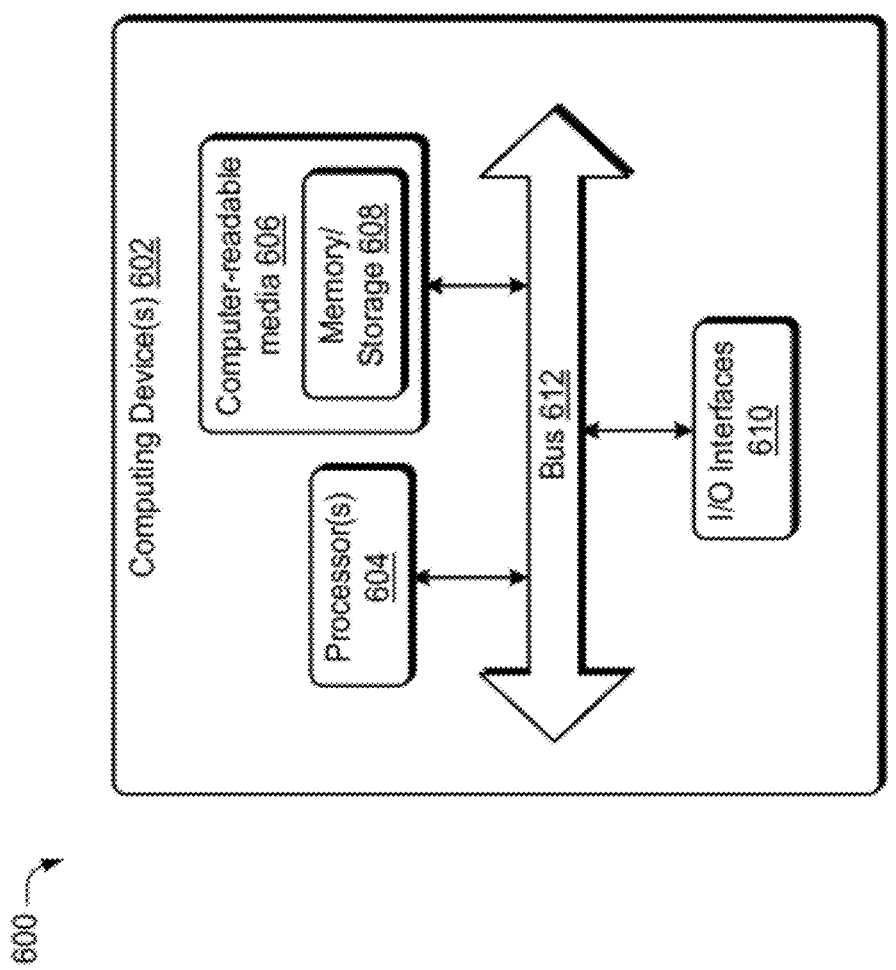
FIG. 6 illustrates an example computing system that can be used to implement one or more embodiments.

FIG. 6 illustrates an example system generally at 600 that includes an example computing device 602 that is representative of one or more such computing systems and/or devices that may implement the various embodiments described above. The computing device 602 may be, for example, a server of a service provider 114, a device associated with the client 102 (e.g., a client device), an on-chip system, and/or any other suitable computing device or computing system.

The example computing device 602 includes one or more processors 604 or processing units, one or more computer-readable media 606 which may include one or more memory and/or storage components 608, one or more input/output (I/O) interfaces 610 for input/output (I/O) devices, and a bus 612 that allows the various components and devices to communicate one to another. Computer-readable media 606 and/or one or more I/O devices may be included as part of, or alternatively may be coupled to, the computing device 602. The bus 612 represents one or more of several types of bus structures, including a memory bus or memory controller, a peripheral bus, an accelerated graphics port, and a processor or local bus using any of a variety of bus architectures. The bus 612 may include wired and/or wireless buses.

The one or more processors 604 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 608 represents memory/storage capacity associated with one or more computer-readable media. The memory/storage component 608 may include volatile media (such as random access memory (RAM)) and/or nonvolatile media (such as read only memory (ROM), Flash memory, optical disks, magnetic disks, and so forth). The memory/storage component 608 may include fixed media (e.g., RAM, ROM, a fixed hard drive, etc.) as well as removable media (e.g., a Flash memory drive, a removable hard drive, an optical disk, and so forth).

Input/output interface(s) 610 allow a user to enter commands and information to computing device 602, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via the network 112. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the resource manager module 120, applications 108, communication module 110, application store module 111 and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 602 may be configured to implement particular instructions and/or functions corresponding to the software and/or hardware modules implemented on computer-readable media. The instructions and/or functions may be executable/operable by one or more articles of manufacture (for example, one or more computing devices 602 and/or processors 604) to implement techniques for filtering and promoting application store applications, as well as other techniques. Such techniques include, but are not limited to, the example procedures described herein. Thus, computer-readable media may be configured to store or otherwise provide instructions that, when executed by one or more devices described herein, cause various techniques for filtering and promoting application store applications.

CONCLUSION

Techniques for filtering and promoting application store applications have been described herein. The described techniques can be employed to provide filtered application information and/or application promotions to client devices that are based at least in part upon system information that describes configurations and capabilities of the client devices. System information for a client device can be detected in various ways and can be used to filter application data in an application catalog. Page information to be provided to the client device for interaction with the application catalog is then ascertained using the filtered application data. The page information enables the client device to render targeted application store pages having filtered application information and/or promotions that are selected based on the detected system information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media comprising instructions stored thereon, that responsive to execution by a computing device, cause the computing device to implement a resource manager module configured to perform acts comprising:
    detecting system information regarding a device class assigned to a client device or at least one of a hardware configuration for the client device or one or more capabilities of the client device, the system information detected responsive to the client device accessing an application catalog;
    determining the device class directly from the system information if the device class is included with the system information;
    if the system information does not include the device class of the client device, dynamically determining the device class of the client device based on the at least one of the hardware configuration for the client device or the one or more capabilities of the client device;
    filtering application data in the application catalog based on the device class of the client device to identify different filter groups of applications, the different filter groups comprising: a first filter group that includes targeted applications that are targeted to the device class of the client device, a second filter group that includes general applications that are configured for use with multiple different device classes, a third filter group that includes installed applications that are already installed on the client device, and a fourth filter group that includes incompatible applications that are incompatible with the device class of the client device;
    ascertaining information for interaction with the application catalog using the filtered application data; and
    communicating the ascertained information to the client device sufficient to enable the client device to render one or more filtered views of the application catalog, the one or more filtered views of the application catalog configured to display the targeted applications and prevent display of the installed applications and the incompatible applications.

2. The one or more computer-readable storage media of claim 1, wherein the system information comprises information regarding the hardware configuration of the client device.

3. The one or more computer-readable storage media of claim 1, wherein the system information comprises information regarding the device class assigned to the client device.

4. The one or more computer-readable storage media of claim 3, wherein the device class assigned to the client device is configured to indicate a type of device for the client device.

5. The one or more computer-readable storage media of claim 3, wherein the device class assigned to the client device is configured to indicate one or more hardware components of the client device.

6. The one or more computer-readable storage media of claim 1, wherein detecting system information for the client device comprises collecting system information provided by the client device over a network to a service provider in conjunction with a request, from the client device, to access resources from the service provider.

7. The one or more computer-readable storage media of claim 1, wherein detecting system information for the client device comprises referencing a client account associated with the client device to obtain the system information.

8. The one or more computer-readable storage media of claim 1, wherein the one or more filtered views of the application catalog is further configured to display the general applications such that the targeted applications are differentiated from the general applications.

9. A computer implemented method comprising:
    obtaining system information regarding a device class assigned to a client device or one or more hardware components and one or more capabilities of the client device, the system information obtained responsive to the client device accessing an application catalog;
    determining the device class directly from the system information if the device class is included with the system information;
    if the system information does not include the device class of the client device, dynamically ascertaining the device class of the client device based on the one or more hardware components and the one or more capabilities of the client device;
    filtering the application catalog based on the device class by:
        identifying targeted applications that are targeted to the device class of the client device;
        determining general applications that are configured for use with multiple different device classes;
        ascertaining installed applications that are already installed on the client device; and
        finding incompatible applications that are incompatible with the device class of the client device; and
    returning filtered application catalog information to the client device, the filtered application catalog information configured to differentiate the targeted applications from the installed applications and the incompatible applications.

10. The computer implemented method of claim 9, wherein the device class assigned to the client device is configured to classify the client device according to a device type.

11. The computer implemented method of claim 9, wherein the filtered application catalog information is further configured to differentiate the targeted applications from the general applications.

12. The computer implemented method of claim 9, wherein the filtered application catalog information is configured to differentiate the targeted applications from the installed applications and the incompatible applications by preventing the display of the installed applications and the incompatible applications.

13. A client device comprising:
    a processor to implement an application store module configured to:
        collect system information regarding a hardware configuration and capabilities of the client device, the system information collected via interaction with an operating system of the client device; and monitor for changes to the system information of the client device;

a transmitter to:

communicate a device class assigned to the client device to a service provider to facilitate targeted access to the application catalog responsive to the client device accessing the application catalog; or if the device class is not assigned to the client device, communicate the collected system information to the service provider to facilitate targeted access to the application catalog responsive to the client device accessing the application catalog;

a receiver to obtain information returned by the service provider that reflects filtering of the application catalog based on the communicated device class or system information regarding the hardware configuration and capabilities of the client device to dynamically identify one or more applications targeted to the device class or the hardware configuration and capabilities of the client device; and a display to display identifiers of the one or more applications targeted to the device class or the hardware configuration and capabilities of the client device in the application catalog using the information that is returned, wherein the display is further configured to prevent display of incompatible applications that are incompatible with the device class or the hardware configuration and capabilities of the client device.

14. The client device of claim 13, wherein the display is further configured to display, in the application catalog, a portion promoting one or more applications that match the device class or the hardware configuration and capabilities of the client device.

* * * * *